(12) United States Patent  (10) Patent No.: US 7,729,556 B2
Chien  (45) Date of Patent: Jun. 1, 2010

(54) METHOD FOR IMPROVING IMAGE QUALITY AND IMAGE PROCESSOR FOR SAME

(75) Inventor: Roger Chien, Taipei Hsien (TW)

(73) Assignee: Princeton Technology Corporation, Hsin Tien, Taipei County (TW)

( * ) Notice: Subject to any disclaimer, the term of this patent is extended or adjusted under 35 U.S.C. 154(b) by 897 days.

(21) Appl. No.: 11/383,963

(22) Filed: May 18, 2006

(65) Prior Publication Data

US 2007/0140583 A1    Jun. 21, 2007

(30) Foreign Application Priority Data

Dec. 15, 2005    (TW) .............................. 94144520 A

(51) Int. Cl.
 *G06K 9/40* (2006.01)
(52) U.S. Cl. .................... 382/268; 382/254; 382/232; 382/233; 382/250; 382/266
(58) Field of Classification Search ................. 358/1.9, 358/1.1; 375/240.29; 382/199–200, 194–195, 382/233, 266–269, 261, 264, 275, 298; 708/402; 711/200
See application file for complete search history.

(56) References Cited

U.S. PATENT DOCUMENTS 5,258,835 A    11/1993    Kato
5,825,937 A *  10/1998    Ohuchi et al. ............... 382/261
6,360,024 B1 *  3/2002    Tan et al. ..................... 382/260
6,590,676 B1    7/2003    Karidi
6,600,839 B2 *  7/2003    Mancuso et al. ............ 382/268
6,690,838 B2    2/2004    Zhou
6,845,180 B2 *  1/2005    Matthews .................... 382/268
7,339,601 B2 *  3/2008    Kim ............................ 345/690
7,415,163 B2 *  8/2008    Nishi et al. .................. 382/275
2003/0081854 A1 *  5/2003    Deshpande ................. 382/261
2004/0076338 A1    4/2004    Kriss
2005/0276505 A1 * 12/2005    Raveendran ................ 382/268

FOREIGN PATENT DOCUMENTS

WO    WO 2005117447 A2    12/2005

OTHER PUBLICATIONS

H. C. Reeves and J. S. Lim, "Reduction of blocky effects in image coding," Opt. Eng., vol. 23, pp. 34-37, 1984.*

* cited by examiner

*Primary Examiner*—Andrew W Johns
*Assistant Examiner*—Jason Heidemann
(74) *Attorney, Agent, or Firm*—Winston Hsu

(57) ABSTRACT

In order to improve image quality of high compression ratio images, a de-blocking process is performed on decoded image data, and then an edge enhancement process is performed on the de-blocked image data. Performing the edge enhancement process after performing the de-blocking process can improve image quality of high compression ratio images.

10 Claims, 9 Drawing Sheets

|  y3  |  y6  |  y9  |
|------|------|------|
|  y2  |  y5  |  y8  |
|  y1  |  y4  |  y7  |

Fig. 5

METHOD FOR IMPROVING IMAGE QUALITY AND IMAGE PROCESSOR FOR SAME

BACKGROUND OF THE INVENTION

1. Field of the Invention

The present invention relates to a method for improving image quality, and more particularly, to an image processing method which performs an edge enhancement process after performing a de-blocking process.

2. Description of the Prior Art

Currently, as defined in most video encoding specifications, pixel data of a video picture is usually encoded in units of blocks (e.g., each block is 4 by 4 pixels). A quantization operation of each block is required for increasing the compression ratio of the pixel data. As a result, after being decoded, the block-based video picture has blocking effects, which are discontinuity effects around boundaries between the blocks.

In order to decrease the severity of the blocking effect to improve the quality of block-based video pictures, the H.264 specification, which is a newly introduced video encoding specification, calculates boundary strength to determine discontinuity extent among blocks, utilizes thresholds of quantization parameters to check if the discontinuous edge is a real edge or a blocking effect, and finally provides filters with different strengths to process edges correspondingly. Please refer to the H.264 specification for more information. Although video pictures processed by the de-blocking process of H.264 have good picture quality, the H.264 specification requires complex calculation, which is one of its drawbacks.

SUMMARY OF THE INVENTION

The claimed invention provides a method for improving image quality. The method comprises performing a de-blocking process on a pixel, and performing an edge enhancement process on the de-blocked pixel.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 shows pixel data required by the edge enhancement device of FIG. 4.

DETAILED DESCRIPTION

Since pixel data of a video picture is usually encoded in units of blocks, the present invention takes a block having 8 by 8 pixels as an example to explain the present invention. Please refer to FIG. 1, which shows a block including 8 by 8 pixels. Each pixel in the block is marked by coordinates [j][i], and boundaries of the block are divided into eight block boundaries A~H. The range of the block boundary A includes coordinates [j][i] where i is 0 while j is from 1 to 6; the range of the block boundary B includes coordinates [j][i] where i is 7 while j is from 1 to 6; the range of the block boundary C includes coordinates [j][i] where j is 7 while i is from 1 to 6; the range of the block boundary D includes coordinates [j][i] where j is 0 while i is from 1 to 6; the block boundary E is coordinates [j][i] where i is 0 while j is 0; the block boundary F is coordinates [j][i] where i is 0 while j is 7; the block boundary G is coordinates [j][i] where i is 7 while j is 7; and the block boundary H is coordinates [j][i] where i is 7 while j is 0. The details are as follows.

Figure 2:
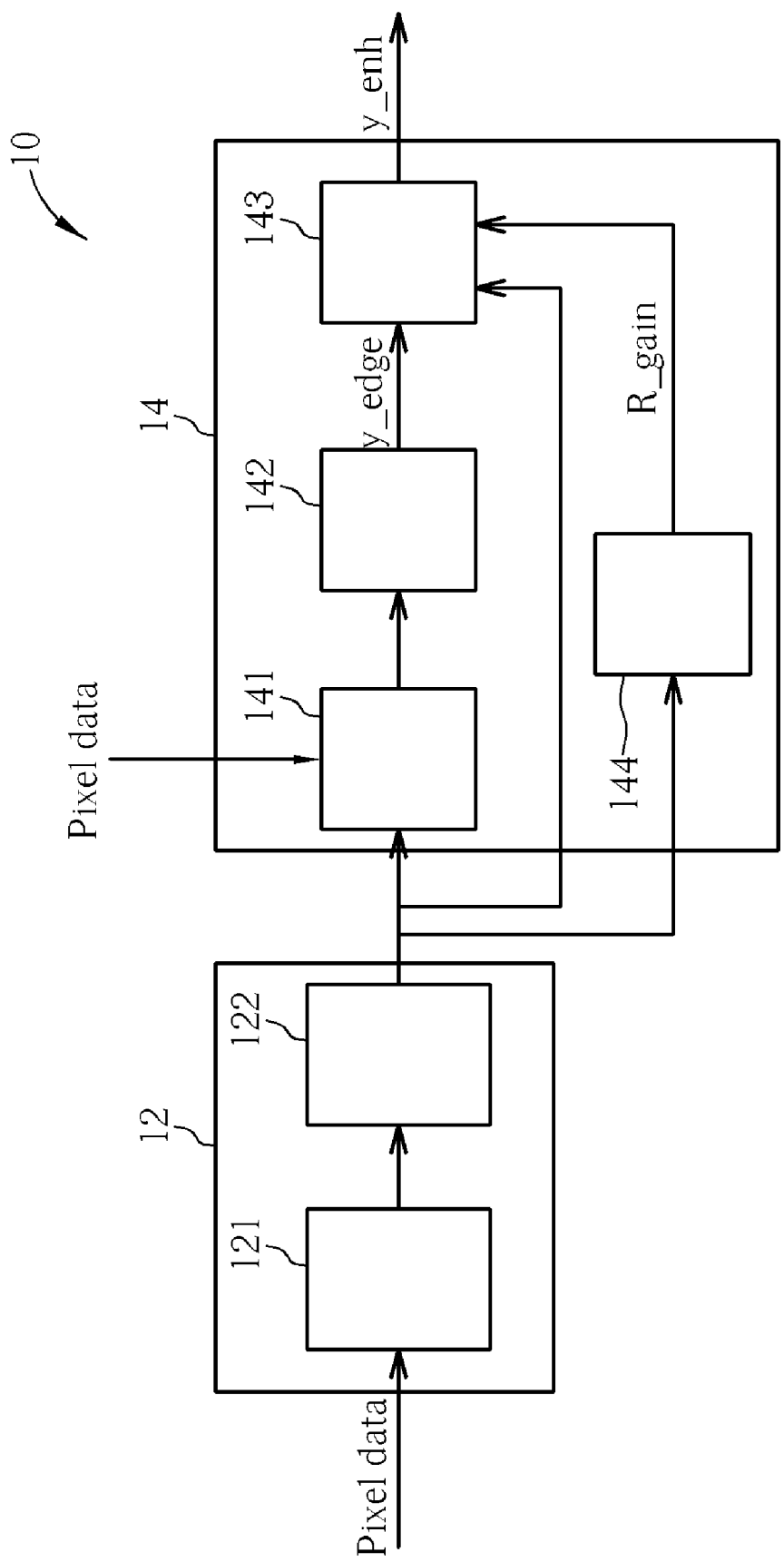
FIG. 2 is a diagram of an image processor of the present invention.

Please refer to FIG. 2, which is a diagram of an image processor 10 of the present invention. The image processor 10 comprises a de-blocking device 12 for performing a de-blocking process, and an edge enhancement device 14 for performing an edge enhancement process. The de-blocking device 12 comprises a comparison device 121 and a compensation device 122. The edge enhancement device 14 comprises an edge-detecting module 141, an edge-comparing module 142, an enhancement module 143, and a gain module 144. The detailed operations of each element are described later.

Figure 3:
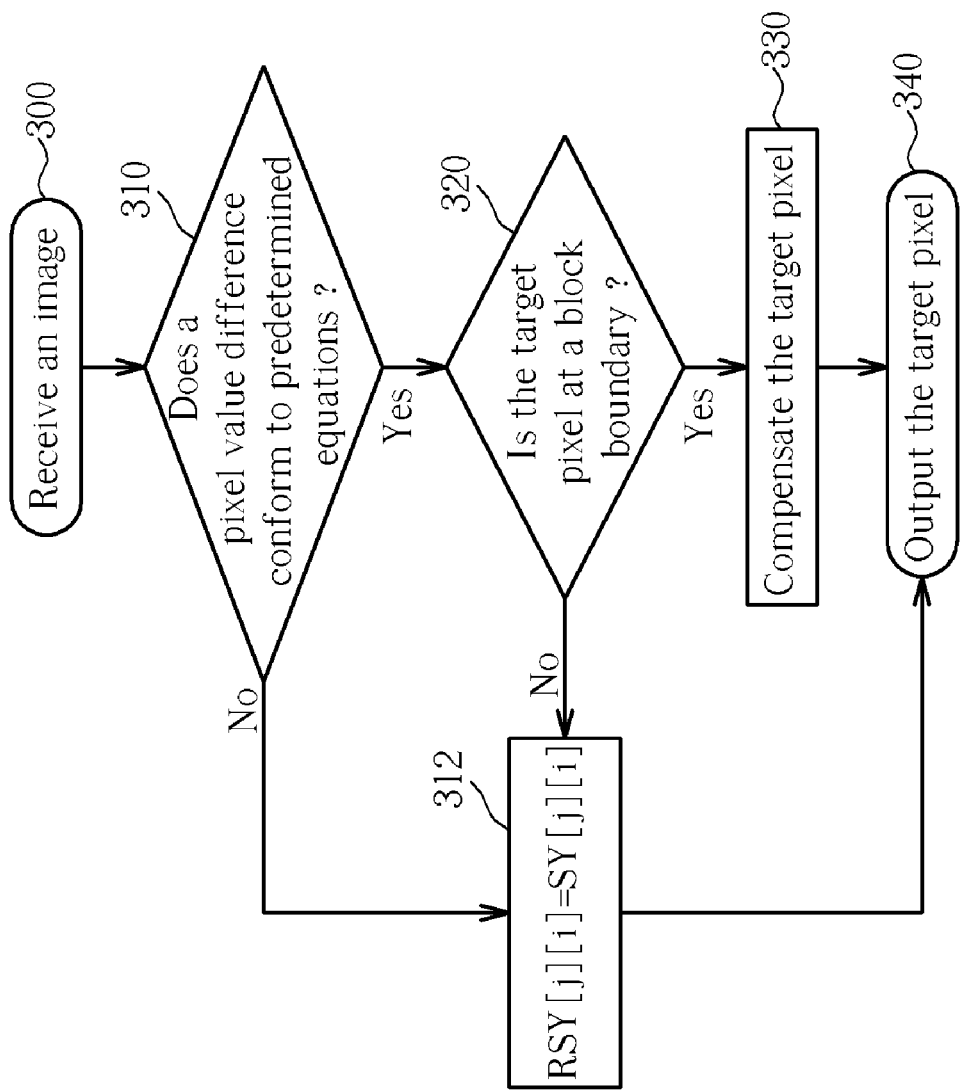
FIG. 3 is a flowchart of a de-blocking process of the present invention.

Please refer to FIG. 3, which is a flowchart of the de-blocking process of the present invention. Steps are as follows.

Step 300: An image is received;

Step 310: Determine whether a pixel value difference between a target pixel and pixels adjacent to the target pixel conforms to predetermined equations. If so, step 320 is entered; otherwise, step 312 is entered.

The comparison device 121 compares a target pixel with pixels adjacent to the target pixel. The predetermined equations are as follows:

$$(delta1 < thrsh1) \& (delta2 < thrsh2) \& (delta3 < thrsh3);$$

wherein the values of thrsh1, thrsh2, and thrsh3 are 100 in this embodiment.

If the de-blocking process compensates the target pixel in a vertical direction, the target pixel is compared with pixels adjacent to the target pixel in a horizontal direction. The comparison equations are as follows:

$$delta1 = (float)fabs((double)(SY[j][i-1]) - SY[j][i]));$$

$$delta2 = (float)fabs((double)(SY[j][i]) - SY[j][i+1]));$$

$$delta3 = (float)fabs((double)(SY[j][i-1]) - SY[j][i+1])).$$

If the de-blocking process compensates the target pixel in the horizontal direction, the target pixel is compared with pixels adjacent to the target pixel in the vertical direction. The comparison equations are as follows:

$$delta1 = (float)fabs((double)(SY[j-1][i]) - SY[j][i]));$$

$$delta2 = (float)fabs((double)(SY[j][i]) - SY[j+1][i]));$$

$$delta3 = (float)fabs((double)(SY[j-1][i]) - SY[j+1][i])).$$

If delta1, delta2, and delta3 are all smaller than the corresponding thresholds, this indicates that the blocking effect might occur between the target pixel and adjacent pixels.

Then, step 320 is entered. Otherwise, the real image difference occurs between the target pixel and adjacent pixels. Therefore, the de-blocking process does not have to compensate the target pixel. In other words, the target pixel is not de-blocked. Then, step 312 is entered.

Figure 1:
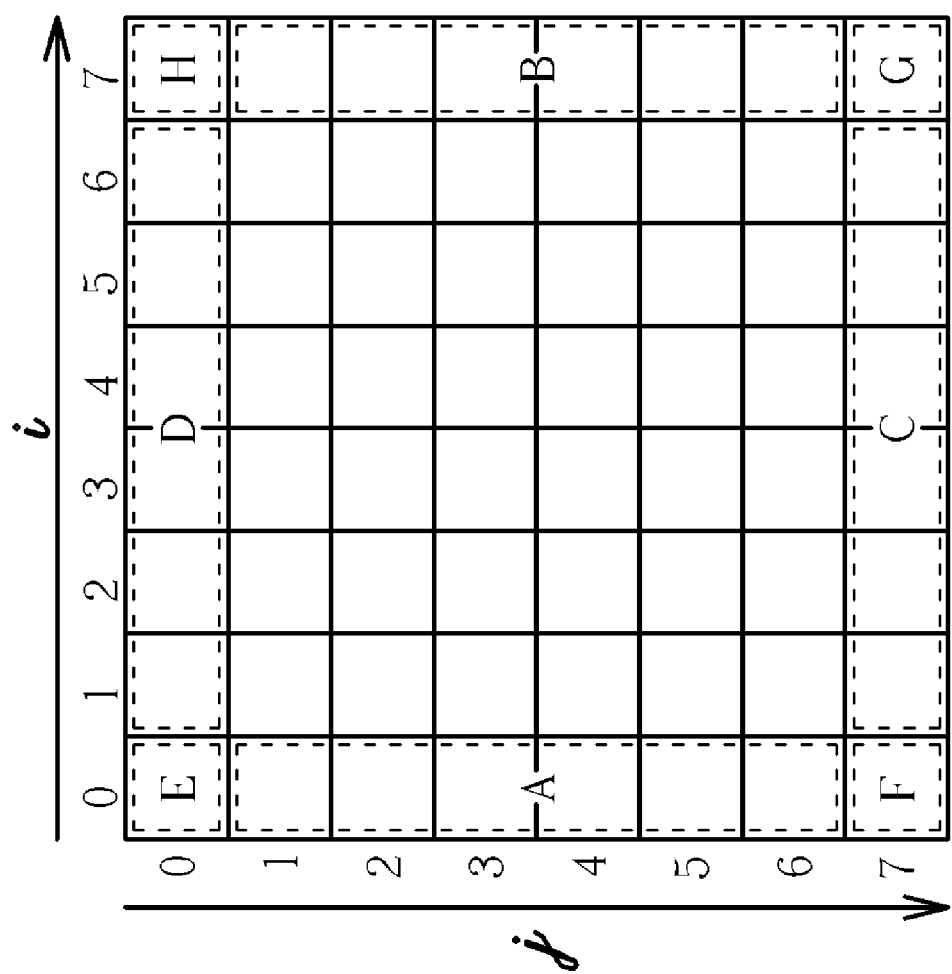
FIG. 1 shows a block of 8 by 8 pixels used in the present invention.

Step 312: The pixel value of the target pixel is set to the result RSY, such as RSY[j][i]=SY[j][i], wherein RSY represents the pixel value of the de-blocked target pixel, and SY represents the original pixel value of the target pixel. Next, step 340 is entered;

Step 320: Check if the target pixel is at one of the block boundaries A~H as shown in FIG. 1. If so, step 330 is entered. If the target pixel is not at any one of the block boundaries A~H, step 312 is entered.

The compensation device 122 checks if the target pixel is at one of the block boundaries A~H. If so, step 330 is entered. Otherwise, step 312 is entered. The pixel value of the target pixel is set to the result RSY, such as RSY[j][i]=SY[j][i].

Step 330: The target pixel is compensated (or de-blocked) according to the condition corresponding to the block boundary at which the target is;

Step 340: The pixel value of the de-blocked target pixel is output to the edge enhancement device 14.

In step 330, the compensation device 122 compensates the target pixel according to the condition corresponding to the block boundary at which the target is. In this embodiment, the conditions corresponding to the block boundaries A~H for compensating the target pixel are as follows:

Boundary Block A:

$RSY[j][i]=0.1667*(SY[j][i-1]+2*SY[j][i]+2*SY[j][i+1]+SY[j][i+2]);$

Boundary Block B:

$RSY[j][i]=0.1667*(SY[j][i-1]+2*SY[j][i]+2*SY[j][i+1]+SY[j][i+2]);$ $RSY[j][i-1]=0.2*(2*SY[j][i-1]+SY[j][i]+SY[j][i+1]+SY[j][i+2]);$

Boundary Block C:

$RSY[j][i]=0.2*(SY[j-2][i]+2*SY[j-1][i]+2*SY[j][i]);$ $RSY[j-1][i]=0.25*(SY[j-2][i]+2*SY[j-1][i]+SY[j][i]);$

Boundary Block D:

$RSY[j][i]=0.2*(SY[j-2][i]+2*SY[j-1][i]+2*SY[j][i]);$

Boundary Block E:

$RSY[j][i]=0.2*(2*SY[j][i]+SY[j][i-1]+SY[j-1][i-1]+SY[j-1][i]);$

Boundary Block F:

$RSY[j][i]=0.2*(2*SY[j][i]+SY[j][i-1]+SY[j+1][i-1]+SY[j+1][i]);$

Boundary Block G:

$RSY[j][i]=0.2*(2*SY[j][i]+SY[j][i+1]+SY[j+1][i]+SY[j+1][i+1]);$

Boundary Block H:

$RSY[j][i]=0.2*(2*SY[j][i]+SY[j][i+1]+SY[j-1][i]+SY[j-1][i+1]).$

Figure 4:
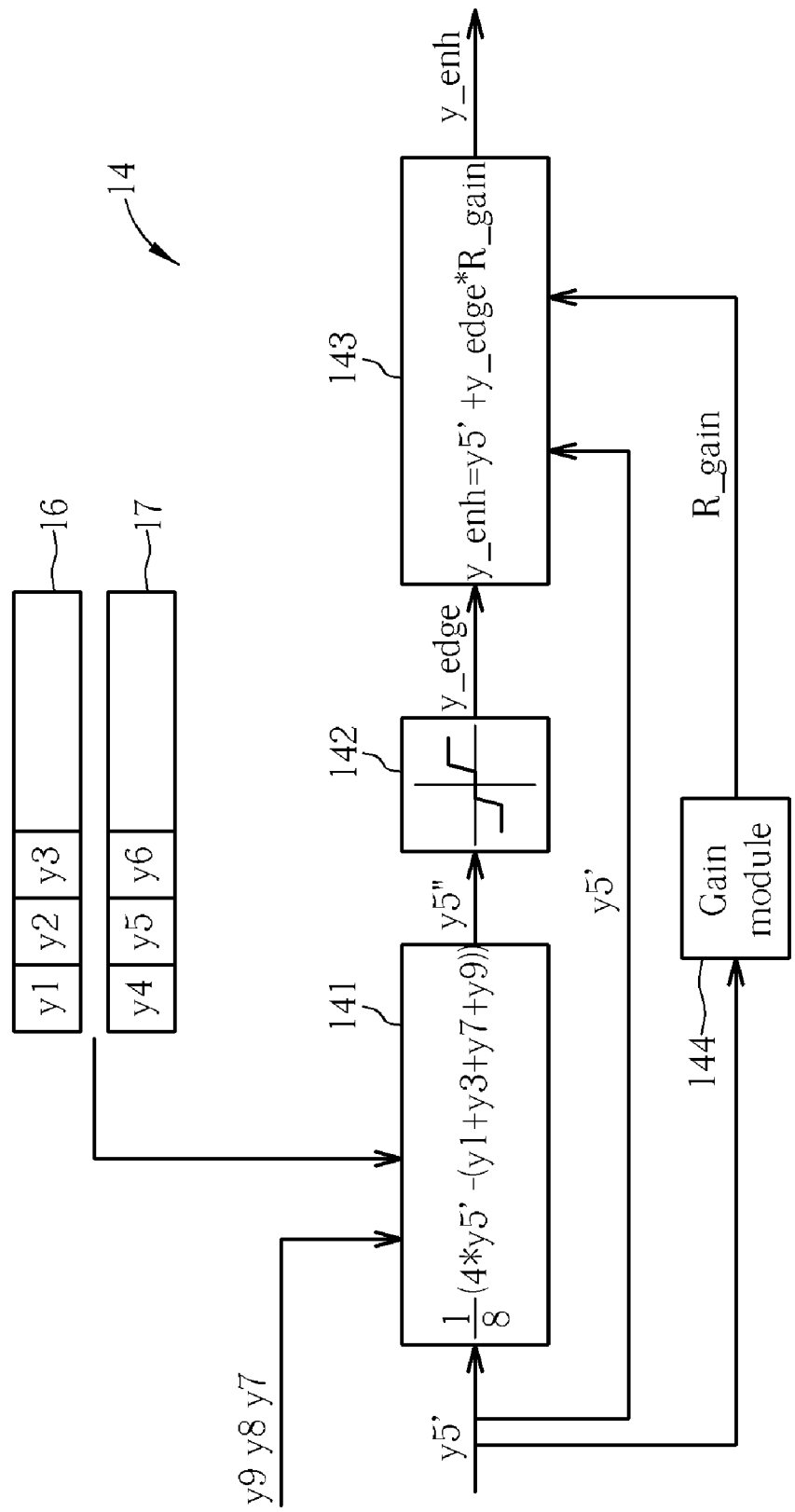
FIG. 4 shows operation of the edge enhancement device and row registers of FIG. 2.
Figure 5:
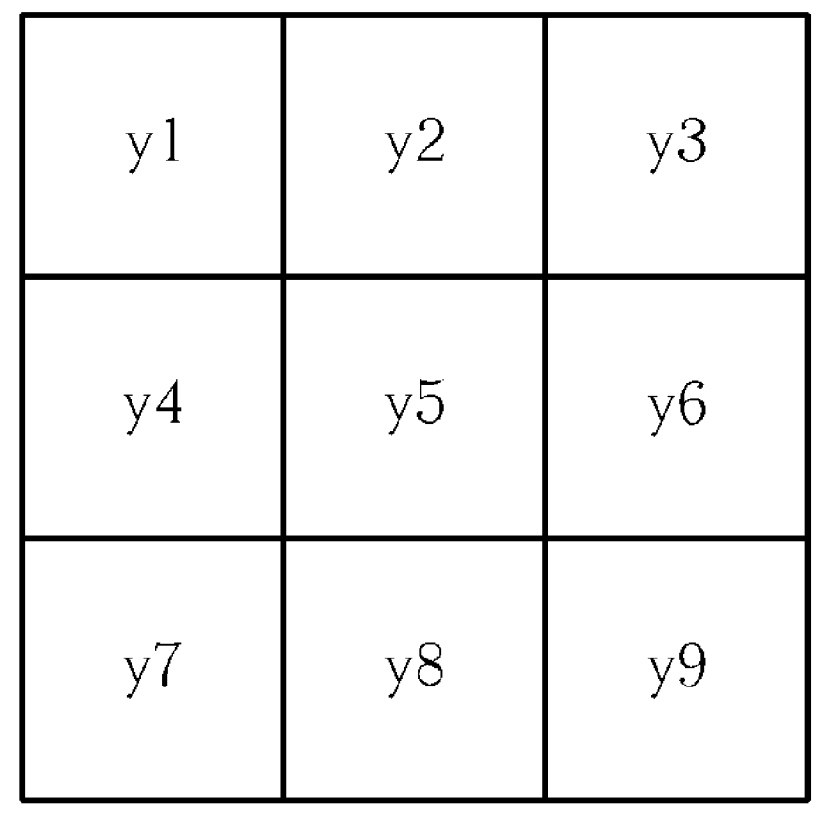

Next, how the edge enhancement device 14 performs the edge enhancement process is described. Please refer to FIG. 4 and FIG. 5, FIG. 4 shows the operation among the edge enhancement device 14 and row registers 16 and 17 based on the present invention. FIG. 5 shows the pixel data required by the edge enhancement device 14. Suppose that the de-blocking device 12 has already performed the de-blocking process on the target pixel y5 and generated a pixel y5' to be output to the edge enhancement device 14. At this time, the edge enhancement device 14 must obtain other pixels, y1~y4 and y6~y9 shown in FIG. 5, adjacent to the target pixel y5.

Figure 6:
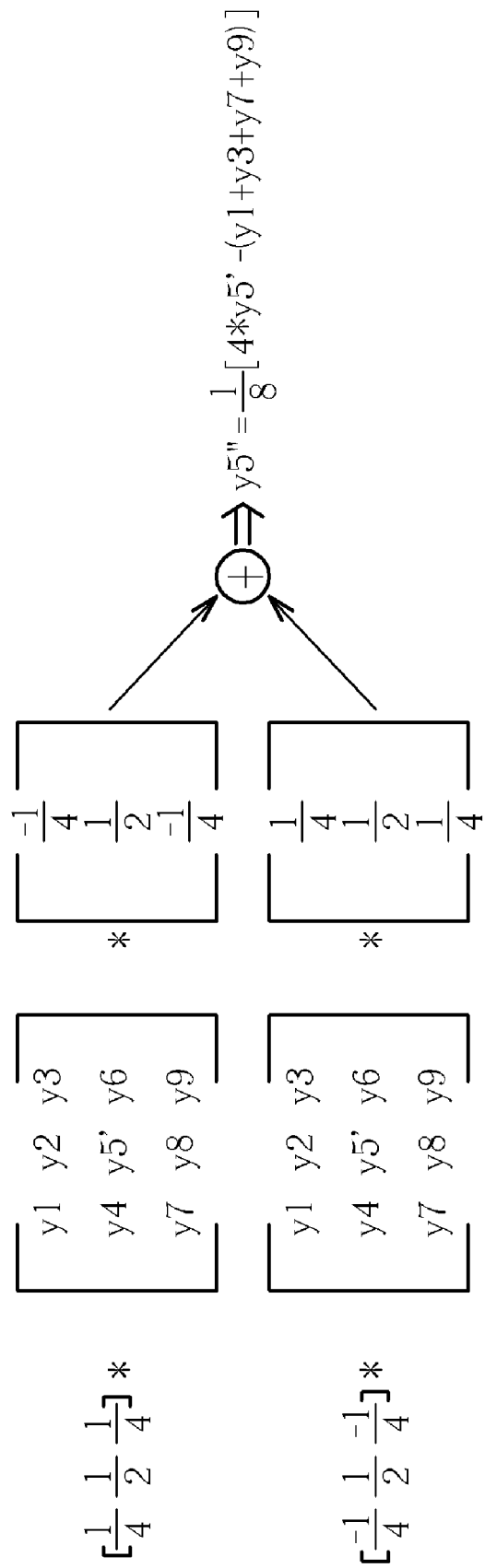
FIG. 6 shows calculation required by the edge-detecting module of FIG. 4.

In FIG. 4, the edge-detecting module 141 receives upcoming pixel data y7~y9, receives the pixel data y5' from the de-blocking device 12, and obtains pixel data y1~y4 and y6 from the row registers 16 and 17. Please refer to FIG. 6, which shows the calculations of the edge-detecting module 141. The edge-detecting module 141 calculates an edge strength of the pixel y5', and the result is as follows:

$y5''=1/8[4*y5'-(y1+y3+y7+y9)];$

The edge strength y5" is input to the edge-comparing module 142 of FIG. 4 to convert the edge strength y5" into an edge value y_edge. Please refer to FIG. 7, which shows a predetermined curve used in the edge-comparing module 142. The edge strength y5" is converted into the edge value y_edge via the predetermined curve.

Figure 7:
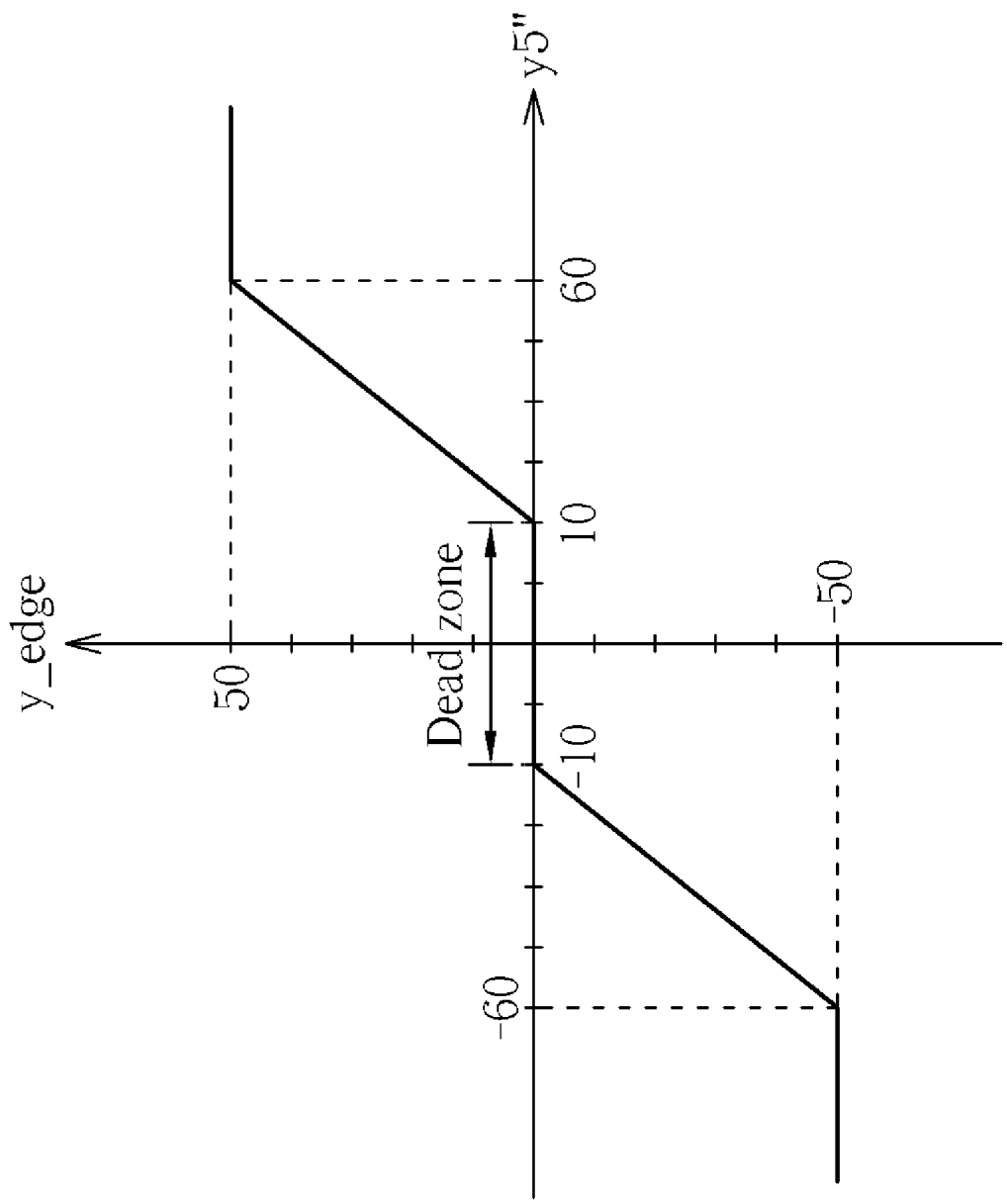
FIG. 7 shows a predetermined curve used in the edge-comparing module of FIG. 4.

In this embodiment, a dead zone of FIG. 7 is within the range of y5" between 10 and −10. The dead zone can prevent amplification of small noise, and thereby the edge value y_edge of the dead zone is set to 0. In other words, y5' is not enhanced substantially. When y5" is larger than 60 or smaller than −60, it indicates that the difference between the pixel y5' and other adjacent pixels is huge. In order to prevent the huge difference from being tremendously enhanced, the edge value y_edge of such two regions are set to limitations of 50 and −50, respectively. When y5" is between −10 and −60, and between 10 and 60, the predetermined curve is a linear curve with a slope of 1, and the edge value y_edge is calculated according to the linear curve. The predetermined curve of FIG. 7 can be other types of curves, and is not intended to be limited as above.

Additionally, the gain module 144 of FIG. 4 checks if the target pixel y5 is at one of the block boundaries A~H as shown in FIG. 1. If so, the gain value R_gain is set to gain*0.5; otherwise, the gain value R_gain is set to a gain of a predetermined value to enhance pixel values. Since the de-blocking device 12 might compensate the de-blocked pixels in these block boundaries A~H. In order to prevent the compensated the de-blocked pixels from being greatly enhanced, the gain value R_gain of the pixels in the block boundaries A~H must be smaller than that of other pixels not in the block boundaries A~H. In this embodiment, the gain value R_gain of the pixels in the block boundaries A~H is set to gain*0.5, wherein the value of gain is 0.4.

Finally, the enhancement module 143 of FIG. 4 performs the edge enhancement process to enhance the pixel y5' according to the edge value y_edge, the gain value R_gain, and the pixel value of the pixel y5' output from the de-blocking device 12. The result of the enhancement process is y_enh.

Figure 8:
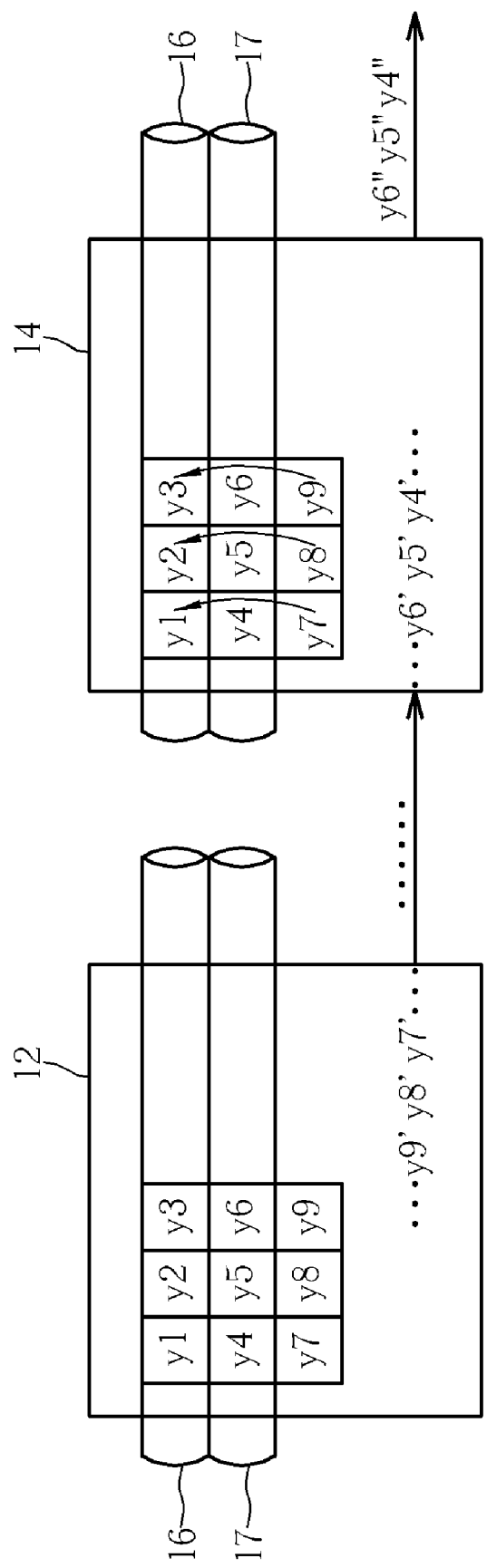
FIGS. 8 and 9 show how the de-blocking device, the edge enhancement device, and row registers cooperate according to the present invention.
Figure 9:
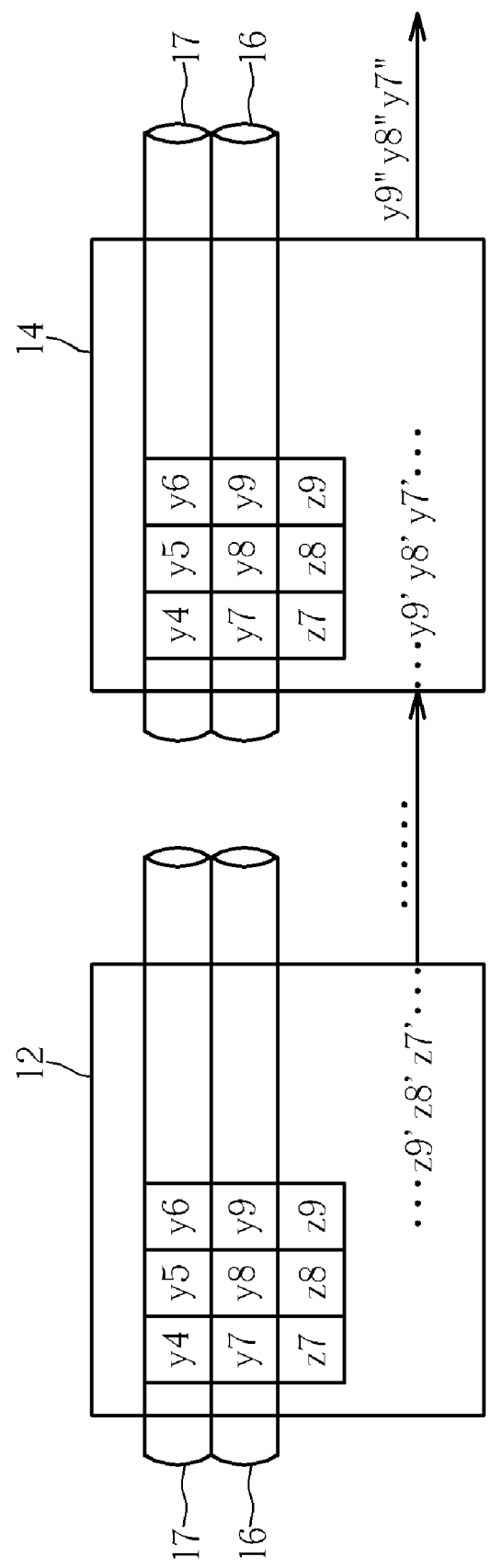

Please refer to FIGS. 8 and 9, which show how the de-blocking device 12, the edge enhancement device 14 and row registers 16 and 17 cooperate. The present invention utilizes two row registers. Suppose that pixel data y1, y2, y3 . . . have been already stored in the row register 16 while pixel data y4, y5, y6 . . . have been already stored in the row register 17. The upcoming pixel data y7, y8, y9 . . . are input into the de-blocking device 12 and into the edge enhancement device 14. The de-blocking device 12 obtains pixel data from the row registers 16 and 17 to perform the de-blocking process on the upcoming pixel data y7, y8, y9 . . . sequentially, and then outputs the result of pixel data y7', y8', y9' . . . to the edge enhancement device 14. At the same time, the edge enhancement device 14 obtains pixel data from the row registers 16 and 17, performs the edge enhancement process on the pixel data y4', y5', y6' . . . from the de-blocking device 12 according to the upcoming pixel data y7, y8, y9 . . . , and outputs the enhanced pixel data y4", y5", y6" . . . in sequence. In addition, after the de-blocking device 12 and the edge enhancement device 14 obtains required pixel data from the row register 16, the pixel data y1, y2, y3 . . . stored in the row register 16 are replaced with the upcoming pixel data y7, y8, y9 . . . , so as to process the new pixel data z7, z8, z9 . . . of the next row, shown in FIG. 9. Therefore, the present invention utilizes just two registers 16 and 17 to perform the de-blocking process and the edge enhancement process.

The present invention utilizes the de-blocking process and the edge enhancement process to improve image quality of high compression ratio images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving image quality, the method comprising:
   performing a de-blocking process on a pixel; and
   performing an edge enhancement process on the de-blocked pixel, wherein performing the edge enhancement process on the pixel comprises:
      calculating an edge strength of the pixel, wherein the edge strength of the pixel is calculated according to the formula $y5''=1/8*[4*y5'-(y1+y3+y7+y9)]$, where $y5''$ represents the edge strength of the pixel, $y5'$ represents the de-blocked pixel after the de-blocking process is performed on pixel y5, and y1, y3, y7, and y9 represent corner pixels in a 3×3 matrix of pixels having pixel y5 as a center pixel;
      converting the edge strength of the pixel into an edge value of the pixel;
      checking if the pixel is at a block boundary, and setting an edge enhancement gain of the pixel according to conditions corresponding to the block boundary; and
      performing the edge enhancement process on the pixel according to a pixel value of the pixel, the edge enhancement gain of the pixel, and the edge value of the pixel, wherein the edge enhancement process is performed according to the formula $y\_enh=y5'+y\_edge*R\_gain$, wherein y_enh represents the result of the enhancement process, y_edge represents the edge value of the pixel, and R_gain represents the edge enhancement gain of the pixel.

2. The method of claim 1, wherein performing the de-blocking process on the pixel comprises determining whether a pixel value difference between the pixel to be de-blocked and a pixel adjacent to the pixel to be de-blocked is smaller than a first pixel value difference, and determining whether a pixel value difference between two pixels adjacent to the pixel to be de-blocked is smaller than a second pixel value difference.

3. The method of claim 2 further comprising checking if the pixel to be de-blocked is at a block boundary, wherein performing the de-blocking process on the pixel is performing the de-blocking process on the pixel according to conditions corresponding to the block boundary.

4. The method of claim 1, wherein performing the edge enhancement process on the de-blocked pixel comprises checking if the de-blocked pixel is at a block boundary, detecting a difference of pixel values adjacent to the de-blocked pixel and the de-blocked pixel, and performing the edge enhancement process on the de-blocked pixel according to the difference of the pixels adjacent to the de-blocked pixel and the de-blocked pixel and if the de-blocked pixel is at the block boundary.

5. The method of claim 1 further comprising detecting a difference of pixel values adjacent to the de-blocked pixel and the de-blocked pixel, wherein performing the edge enhancement process on the de-blocked pixel is performing the edge enhancement process on the de-blocked pixel according to the difference.

6. An image processor comprising:
   an input for receiving pixel data;
   a de-blocking device for performing a de-blocking process on a pixel;
   an edge enhancement device coupled to the de-blocking device for performing an edge enhancement process on the de-blocked pixel, wherein the edge enhancement device comprises:
      an edge-detecting module for calculating an edge strength of the pixel, wherein the edge strength of the pixel is calculated according to the formula $y5''=1/8*[4*y5'-(y1+y3+y7+y9)]$, where $y5''$ represents the edge strength of the pixel, $y5'$ represents the de-blocked pixel after the de-blocking process is performed on pixel y5, and y1, y3, y7, and y9 represent corner pixels in a 3×3 matrix of pixels having pixel y5 as a center pixel;
      an edge-comparing module coupled to the edge-detecting module for converting the edge strength of the pixel into an edge value of the pixel;
      a gain module for checking if the pixel is at a block boundary, and setting an edge enhancement gain of the pixel according to conditions corresponding to the block boundary; and
      an enhancement module coupled to the edge-comparing module and the gain module for performing the edge enhancement process on the pixel according to a pixel value of the pixel, the edge enhancement gain of the pixel, and the edge value of the pixel, wherein the edge enhancement process is performed according to the formula $y\_enh=y5'+y\_edge*R\_gain$, wherein y_enh represents the result of the enhancement process, y_edge represents the edge value of the pixel, and R_gain represents the edge enhancement gain of the pixel; and
   an output for outputting enhanced pixel data.

7. The image processor of claim 6, wherein the de-blocking device comprises a comparison device for determining whether a pixel value difference between the pixel to be de-blocked and a pixel adjacent to the pixel to be de-blocked is smaller than a first pixel value difference, and determining whether a pixel value difference between two pixels adjacent to the pixel to be de-blocked is smaller than a second pixel value difference.

8. The image processor of claim 7, wherein the de-blocking device comprises a compensation device coupled to the comparison device for checking if the pixel to be de-blocked is at a block boundary, and performing the de-blocking process on the pixel according to conditions corresponding to the block boundary.

9. The image processor of claim 6, wherein the edge enhancement device is used for performing the edge enhancement process on the de-blocked pixel according to a difference of pixel values adjacent to the de-blocked pixel and the de-blocked pixel and if the de-blocked pixel is at a block boundary.

10. The image processor of claim 6, wherein the edge enhancement device is used for performing the edge enhancement process on the de-blocked pixel according to a difference of pixel values adjacent to the de-blocked pixel and the de-blocked pixel.

* * * * *